US006540422B2

(12) United States Patent
Torii

(10) Patent No.: US 6,540,422 B2
(45) Date of Patent: Apr. 1, 2003

(54) PUSH-OUT-TYPE WRITING IMPLEMENT

(75) Inventor: Osamu Torii, Kyoto (JP)

(73) Assignees: GSP Institute Co., Ltd., Kyoto (JP); Ancos Co., Ltd., Hyogo (JP)

( * ) Notice: Subject to any disclaimer, the term of this patent is extended or adjusted under 35 U.S.C. 154(b) by 0 days.

(21) Appl. No.: 10/146,972

(22) Filed: May 15, 2002

(65) Prior Publication Data

US 2002/0176731 A1 Nov. 28, 2002

(30) Foreign Application Priority Data

May 22, 2001 (JP) ....................................... 2001-153148
Feb. 15, 2002 (JP) ....................................... 2002-039275

(51) Int. Cl.[7] ................................................ B23K 27/00
(52) U.S. Cl. ......................................................... 401/31
(58) Field of Search .............................. 401/29, 30, 31, 401/32, 33

(56) References Cited

U.S. PATENT DOCUMENTS 3,294,068 A * 12/1966 Hechtle ....................... 401/31
5,599,122 A * 2/1997 Yu .............................. 401/31
5,749,663 A * 5/1998 Takahashi ..................... 401/31
5,899,618 A 5/1999 Kobayashi et al.
5,927,881 A * 7/1999 Yang ........................... 401/29

* cited by examiner

*Primary Examiner*—Gregory L. Huson
*Assistant Examiner*—Huyen Le
(74) *Attorney, Agent, or Firm*—Jordan and Hamburg LLP

(57) ABSTRACT

A click-type writing implement with reduced diameter by suppressed swerving of writing element during advancing and with improved easiness of assembling and improved ornamental appearance, comprising manipulator pieces on outside; actuator pieces respectively advanced or retracted by the manipulator pieces; a main shaft arranging writing elements as forward and rearward slidable; springs respectively applying rearward stress on the actuator pieces. The each actuator piece has a first and second projecting portions, which protrude laterally respectively at forefront portion and at a rearward portion distanced from the forefront portion. The main shaft has an inner face comprised of a small-internal-diameter portion in vicinity of rearmost retracted position of the second projecting portion. The second projecting portion has a cam face for creating outward propelling force when two of the second projecting portions axially bear with each other.

7 Claims, 15 Drawing Sheets

1 EMBODIMENT

FIG. 1 EMBODIMENT

FIG. 2
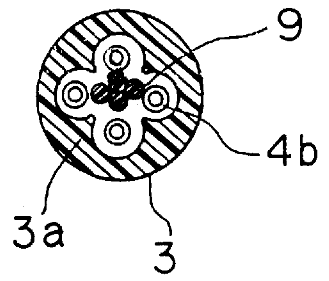
FIG. 3 1ST EMBODIMENT
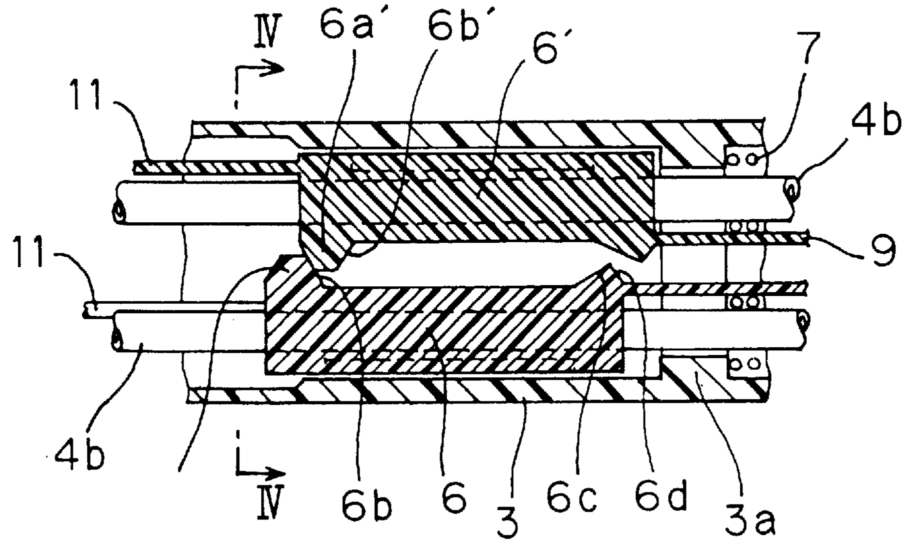
FIG. 4
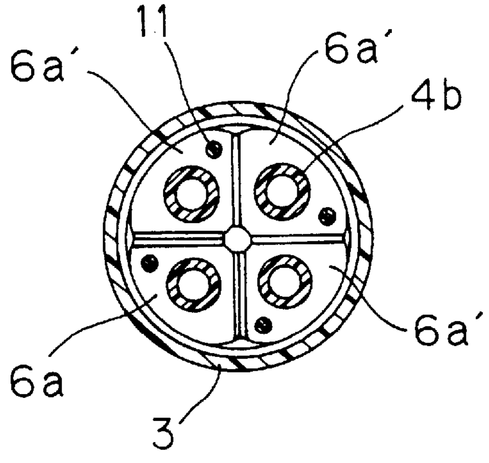

FIG. 5 1ST EMBODIMENT

FIG. 6 1ST EMBODIMENT

FIG. 8 MODIFICATION 1
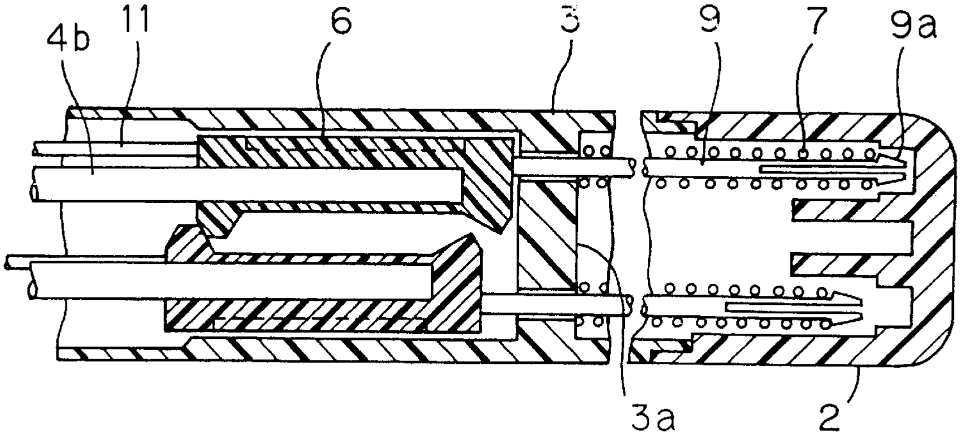
FIG. 9 MODIFICATION 2
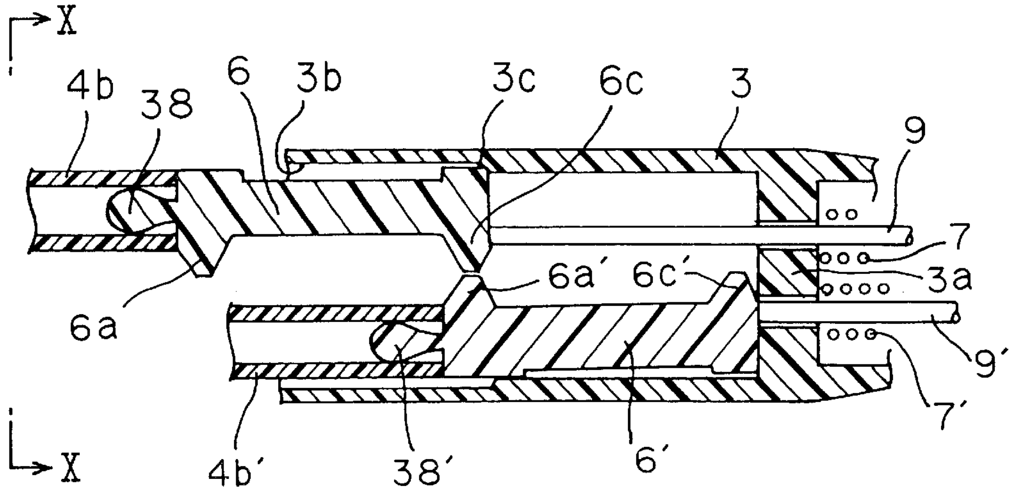
FIG. 10
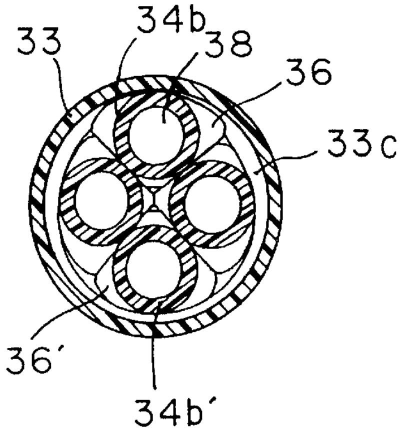

FIG. 11 2ND EMBODIMENT

FIG. 12 2ND EMBODIMENT

FIG. 17 3RD EMBODIMENT

FIG. 18 3RD EMBODIMENT

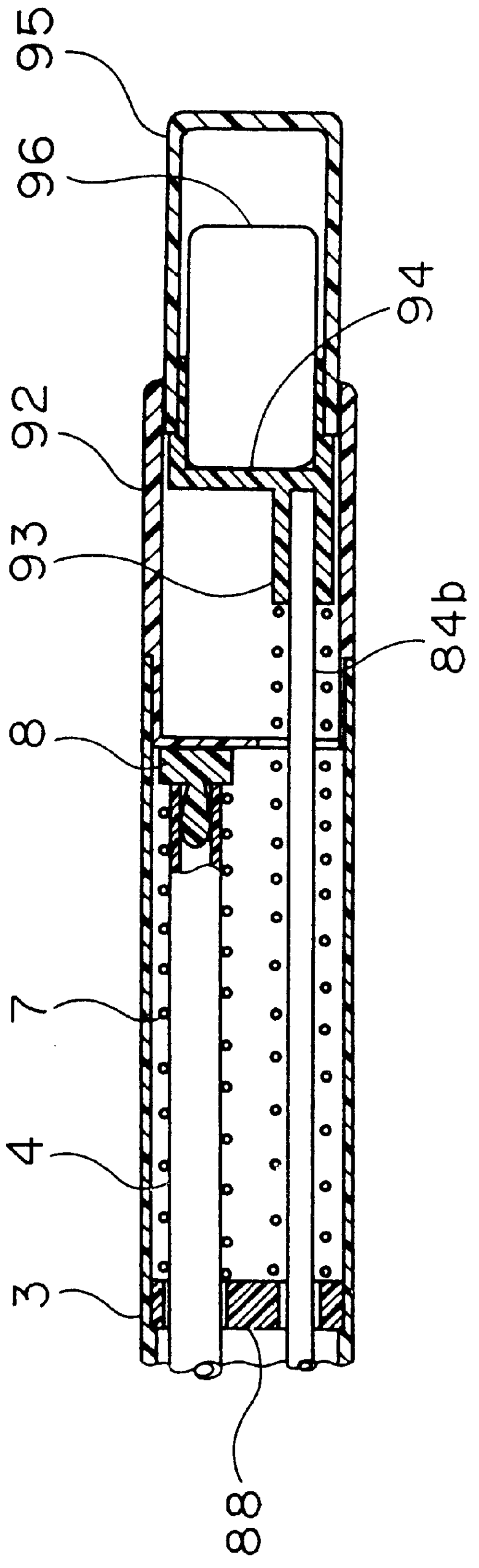
FIG. 20 4TH EMBODIMENT

PUSH-OUT-TYPE WRITING IMPLEMENT

BACKGROUND OF THE INVENTION

This invention relates to a push-out-type writing implement, that is, pens and/or pencils of click type or push-out type; particularly to ones, in which one of writing element(s) in a main shaft is brought forward to be pushed out by slide-wise handling from outside.

In recent years, various kinds of such click-type or push-out-type writing implements are in widespread use. For example, there are commercialized a kind of writing implements in which a writing element is pushed out from and pulled into a shaft body or barrel through one-touch operation, as well as a kind of ballpoint pen that is constructed as capable of switching between three or four colors.

For most of conventional ones of push-out-type writing implements, a plurality of refills are accommodated in a hollow shaft body; and handling tips or manipulator pieces are connected to rear ends of the refills and engaged in sliding grooves as readily advanced and retracted. Only one of the refills protrudes from the forefront tip of the main shaft when one of the manipulator pieces is pushed forward and secured as locked at this position. When another one of the manipulator pieces is pushed, the already protruded one of the manipulator pieces is retracted while another refill connected to the newly pushed manipulator piece is protruded forward and become available for writing or drawing in another color. When to return and accommodate all the refills into the shaft body, either one of retracted manipulator piece is slightly pushed forward; and thereby locking of the protruded manipulator piece is lifted as to be restored to an original position by action of a restoration spring. Such restoration spring is attached to each of the manipulator pieces.

According to such construction of the conventional writing implements, one of the manipulator pieces is pushed forward and then toward central axis of the shaft body, to be locked in the sliding groove. Thus, such motion has to be allowed in a writing implement, and therefore, there arises a problem that diameter of the shaft body becomes inevitably large.

When to conduct advancing and retracting of the writing elements as well as switching operation in the writing implements, in general, manipulator pieces disposed at rear end of the shaft body is pushed and slid by pressing with a thumb. To conduct such a motion, a user has to loosen and re-grip the shaft body on beforehand of such pressing. The advancing and retracting as well as switching operation would not be achievable by a hand when the writing implement is continuously gripped by the hand.

Present invention is made in view of the above, and is aimed to reduce diameter of shaft body by avoiding a large positional shifting of the writing element. It is further aimed to simplify and reduce assembling procedures and parts, even when the writing element is pushed out by a hand constantly gripping the shaft body, and to enable improvement in ornamental appearance of the writing implements.

BRIEF SUMMARY OF THE INVENTION

According to first aspect of the invention, a writing implement comprising: a plurality of manipulator pieces disposed on outside; a plurality of actuator pieces moved by respective one of the manipulator pieces, in at least foreword and rearward directions; writing elements arranged in a hollow main shaft as to be slidable along an inner face of the main shaft; springs each applying rearward stress on respective one of the actuator pieces; each of said actuator pieces comprising: a first projecting piece projecting in a traverse-sectional wise direction of the main shaft, at forefront part of the actuator piece; and a second projecting piece likewise projecting in a traverse-sectional wise direction of the main shaft, as disposed as distanced from the first projecting piece by a predetermined length; said main shaft having a small-internal-diameter part in vicinity of rearmost retracted position of the first projecting portion, and having a large-internal-diameter part larger in a diameter of the small-internal-diameter part at least in a region forefront of the small-internal-diameter part; said second projecting piece having a cam face as shaped for creating a stress in the traverse-sectional wise direction when another second projecting portion of other one of the actuator pieces axially bears down thereto; and each of said actuator pieces being connectable with respective one of the writing elements.

By such features, shape-wise construction at inner face of the shaft body and at actuating tips are simplified, as to enable cost reduction and reduction of diameter of the shaft body.

According to second aspect of the invention, a writing implement further comprising another cam face on the first projecting portion, for creating a stress in a traverse-sectional wise direction when said another second projecting portion of other one of the actuator pieces axially bears down thereto. By such features, the actuators are moved smoothly and reliably.

According to third aspect of the invention, a laterally-gathered bunch of said forefront part of the actuator pieces has a diameter substantially same with that of a laterally-gathered bunch of rear end faces of the writing elements connected with the actuator pieces.

According to fourth aspect of the invention, each of said manipulator pieces is exposed at a part to be gripped at writing or in vicinity of such to-be-gripped part and is connected with respective one of the actuator pieces as transmitted with handling force applied on the actuator piece. By such features, switching between the writing elements as well as retraction of the writing element at writing position are made by a hand continuously gripping the writing implement and without re-gripping motion.

With respect to connection between the actuator and manipulator pieces as to enable transmittance of hand-applied force, it is adoptable a connection using a connector piece or rod between the actuator and manipulator pieces. Not only such connection, it is also adoptable a connection through a refill or writing element itself onto which the manipulator and actuator pieces are respectively attached.

According to fifth aspect of the invention, each of said manipulator pieces is formed as connected with respective one of the actuator pieces and is exposed to outside from a through hole provided on the main shaft. By such features, the manipulator piece and the respective actuator piece may be integrally formed with each other, as to enhance reliability and to simplify a construction.

According to sixth aspect of the invention, at least one of said writing element is a mechanical pencil, and said actuator piece is attached on rear end portion of a fastener-bearer of the mechanical pencil. By features of the invention, a force of fastening a pencil lead in a mechanical pencil is enhanced to be substantially same with the single-use or non-multiplex mechanical pencil. To contrary, a conventional multiplex writing implement having a mechanical pencil element has a problem of low fastening force for holding the pencil lead and enduring a relatively strong writing pressure, because it is the lead casing that is held by a main structure.

BRIEF DESCRIPTION OF THE DRAWING

FIG. 2 is a transverse sectional view of the writing implement shown in the FIG. 1;

FIG. 3 is an enlarges partial view of FIG. 1, showing an essential portion of the writing implement;

FIG. 4 is another transverse sectional view of the writing implement shown in the FIG. 1;

FIG. 8 shows a modified embodiment by a longitudinal sectional view corresponding the FIG. 3;

FIG. 9 shows another modified embodiment by a longitudinal sectional view corresponding the FIG. 3;

FIG. 10 shows a traverse sectional view of the writing implement shown in FIG. 9;

FIG. 20 shows the rearmost part of the writing implement of the fourth embodiment.

DETAILED DESCRIPTION OF THE INVENTION

First embodiment of the present invention will be described with reference to FIGS. 1–7.

Figure 1:
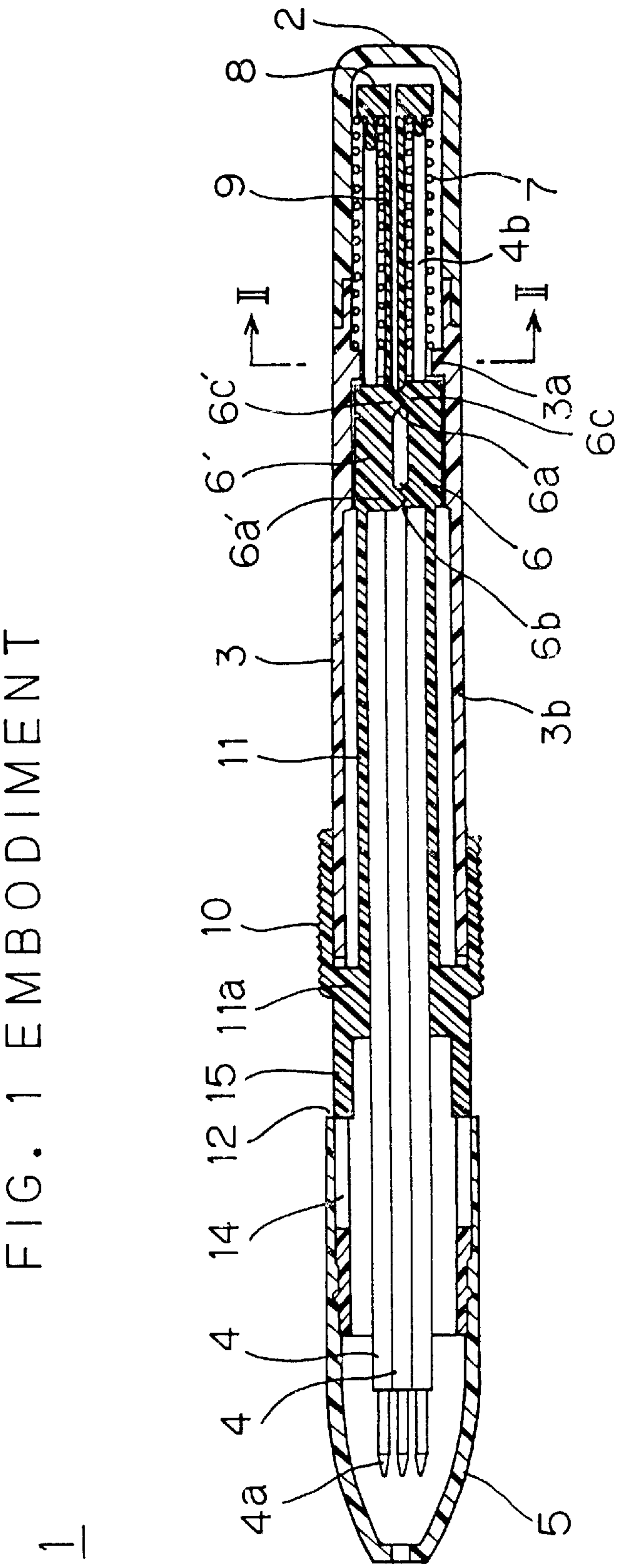
FIG. 1 is a longitudinal sectional view of a writing implement in first embodiment.

FIG. 1 shows a push-out-type writing implement 1, which is comprised of; a rear cap 2; main shaft 3 whose rear end is closed by the rear cap 2; four writing elements 4 accommodated in the main shaft 3; and a front shaft 5 that forms an opening for pushing out and retrieval of writing tip 4*a* of the writing element 4.

As shown in FIG. 1, the four writing elements 4 accommodates, which are ball-point-pen refills in colors different with each other, has a rear end portions 4*b* that extends to penetrate through an actuator piece 6 and supporter portion 3*a*, so as the rear end portions 4*b* reach rear part of the main shaft 3. At rearward of the of the actuator piece 6, as shown in FIG. 2, a supporting portion 3*a* is integrally formed on inner face of the shaft body 3 for supporting a spring 7 and an actuator piece 6 or the like; a refill bearer 8 is formed at rear part of the shaft 9; and a restoration spring 7 is attached to the refill bearer 8. The refills 4 and the restoration springs 7 are held by the supporter portion 3 and the refill bearer 8 in a manner that the restoration springs 7 constantly applies a rearward stress on the actuator pieces 6 and refills 4.

The actuator pieces 6 are for pushing out and retrieval of the writing element 4 or for switching between colors, in response of moving of manipulator pieces 10 that are provided on outside of large-internal-diameter part 3*b* of the main shaft 3. The actuator piece 6 acts in this manner when respective manipulator piece 10 is slide-wise moved with a thumb or the like while the main shaft 3 being gripped with a hand in a position of writing. The each actuator piece 6 is connected with the respective manipulator piece 10 through a connector 11, the connection being made from inside to outside of the main shaft 3.

The actuator pieces 6 are formed as rod-shaped pieces elongated in an axial direction having same shape. At forefront end of each of the actuator pieces 6, there is formed a first projecting portion 6*a* having a substantially right-angled sector shape expanding in a radially outward direction. Circumferential faces of the first projecting portions 6*a* substantially coincide with an inner face of the main shaft 3; and the first projecting portions 6*a* has a cam face 6*b* that is sloped as tapered toward its projecting end.

At rear end of each of the actuator pieces 6, there is formed a second projecting portion 6*c* having a sector form in a cross section as in same manner with the first projection, which has a slope 6*d* at convex surface thereof. Projecting-wise dimension of the each second projecting portion 6*c* is smaller than that of the each first projecting portion 6*a*.

Four of the actuator pieces 6, in correspondence with number of the refills, are arranged along an inner face of the main shaft 3 having a hollow cylindrical shape; in a manner that the first projecting portions 6*a* in a sector-shaped cross section are tightly press-contacted with each other in a lateral or traverse direction of the main shaft 3. A laterally outward propelling force is created by the cam faces 6*b*, 6*d* when one first projecting portion 6*a* of one actuator piece 6 axially bears down, or contacts as axially approached, to another first projecting portion 6*a*' that belongs to an other actuator piece 6'. Such propelling force is also created when the other first projecting portion 6*a*' axially bears down to the second projecting portion 6*c* of the one actuator piece 6.

If either one of the actuator pieces 6 is moved forward, the first projecting portion 6*a* comes ahead of the other first projecting portion 6*a*', thereby forming a gap space or a clearance in a lateral direction, at inside of the main shaft 3. Then, to the gap space, the second projecting portion 6*c* at rear side comes forward. The second projecting portion 6*c* comes to bear on the other first projecting portion 6*a*' as to effect pushing-out action on the other first projecting portion 6*a* in the laterally outward direction, by the sloped cam faces 6*b*', 6*d* of these projecting portion. Consequently, the second projecting portion 6*c* is pushed out ahead of the other first projecting portion 6*a*' of the other actuator pieces 6'.

Figure 5:
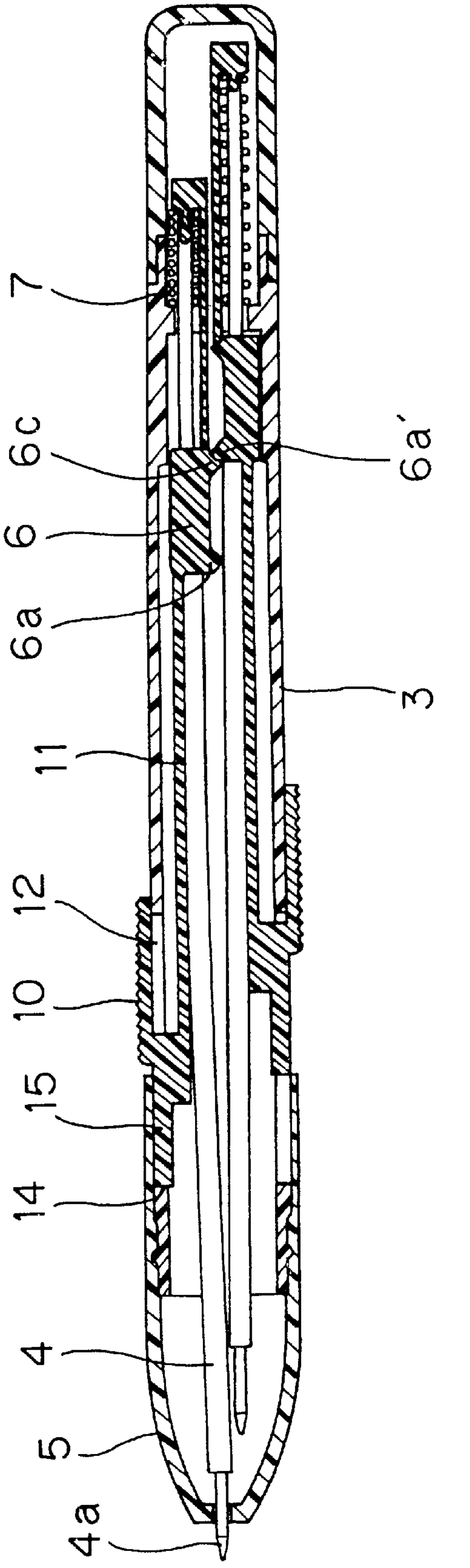
FIG. 5 is a transverse sectional view showing a writing state or a state available for writing, of the writing implement of the FIG. 1.

If acting-on force is lifted after the pushing out action, the restoration spring 7 applies a rearward pulling force on the actuator piece 6*a*. Then, the one second projecting portion 6*c* thus stressed rearward is prevented from rearward shifting by a set of other three first projecting portions 6a' that are arranged as tightly continued with each other in circumferential direction. Thus, a writing element 4 connected with the one second projecting portion 6a is kept in a pushed out position as shown in FIG. 5, thereby writing being enabled. When an other actuator piece 6' is moved forward at such writing-enabled state, one other first projecting portion 6a' comes off from the tightly continued arrangement that has been in support of the one second projecting portion 6c positioned at the writing-enabled state. Thus, each of the three other first projecting portions 6a' is allowed to move laterally outward by action of the cam face 6a'; and the second projecting portion. 6c returns backward to pass over the other first projection 6a' and then to a retracted position.

If the one other actuator piece 6' is continuously moved forward, this actuator piece 6' is pushed ahead of the first projecting portions 6a. Then, after lifting of hand-applied force, a writing element 4 connected to the actuator piece 6' is kept in a position to be readily available for writing.

The actuator piece 6 may be provided with a third projecting portion, not shown in the figure, at between the first and second projecting portions 6a,6c. The actuator 6 explained above moves as adopting single-stroke shifting between two latched positions in respect of the first and second projecting positions 6a,6c, respectively corresponding an accommodated state and a writing-enabled state. Nevertheless, two-stroke slide-wise shifting action is adoptable in which the actuator 6 momentarily stops at a position in respect of the third projecting portion. By such construction, children with small hand or elder people easily make shifting operation.

Figure 6:
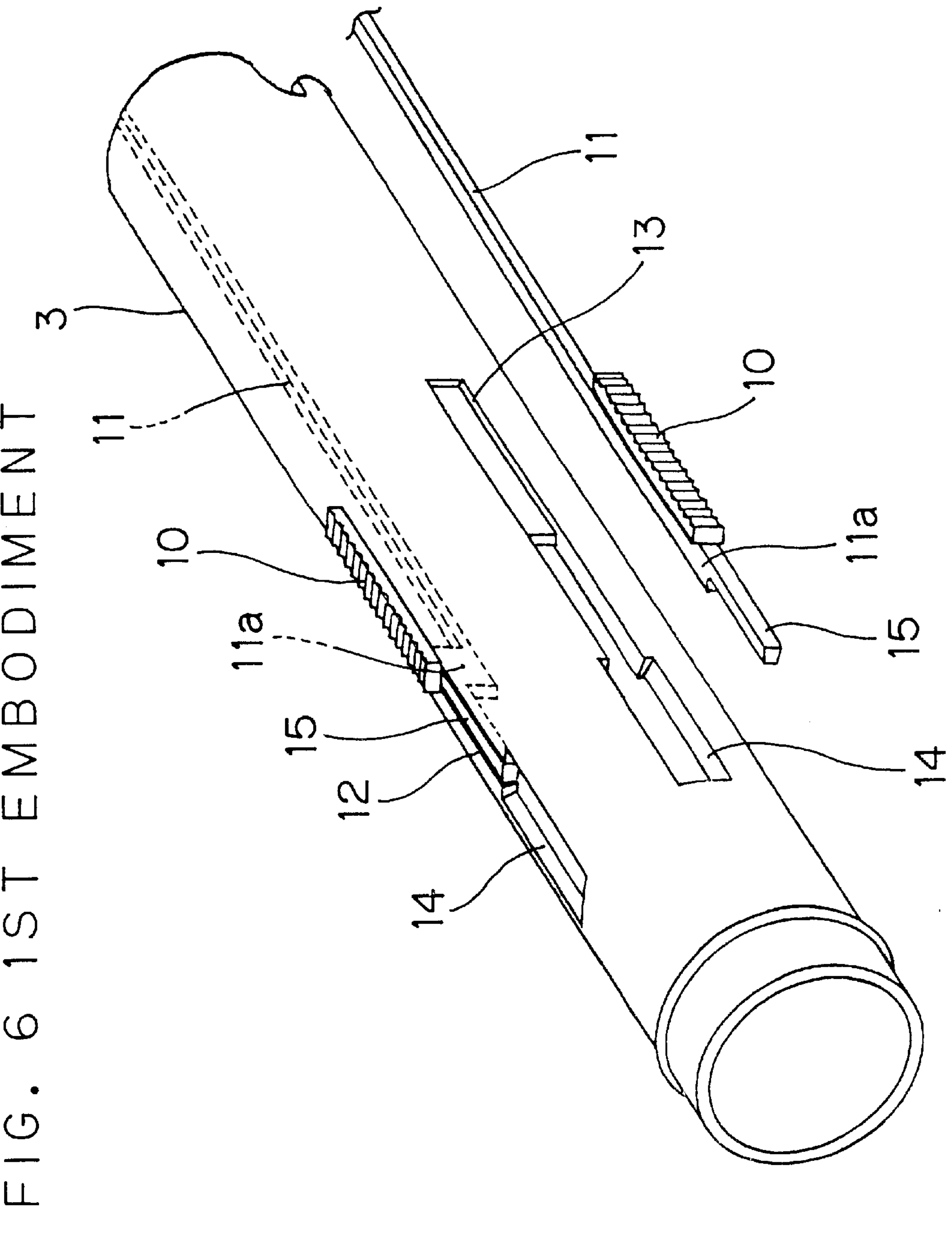
FIG. 6 is a perspective view showing an external shape of a main shaft of the writing implement of the FIG. 1.

At outside of substantially central part of the main shaft 3, as shown in FIG. 6, manipulator pieces 10 are arranged for forward and rearward shifting of the actuators 6 as to facilitate protruding and retracting of the writing element 4a from tip of the forefront shaft 5 and to thereby keep or evade from the position for writing. The manipulator pieces 10 are engaged as readily slidable in a guide slit 12 and guide groove 13 that are bored at outside of the main shaft 3. The guide slit 12 has a length required for forward shifting of the actuator piece 6 from an original retracted position at rear, to a forefront latched position available for writing. The guide slit 12 has a width-wise dimension for penetrating a connecting bit 11a that connects the manipulator piece 10 with a connector 11, from outside to inside of the main shaft 3. At rear of the slit 12, the guide groove 13 is disposed as slightly recessed from outer main surface of the main shaft 3. At forefront of the guide slit 12 and as to be continuous with the guide slit 12, a wide slit 14 is disposed which have a length substantially equal to that of the guide slit 12 and have a width wider than that of the manipulator piece 10.

The manipulator piece 10 has a shape elongated in a longitudinal direction of the main shaft 3 and has a rugged face or knurled face for improving friction with a finger. The connecting bit 11a is formed as extended to be inwardly turned from forefront end of the manipulator piece 10 and to reach inside of the main shaft 3; and the connector 11 is formed as extended rearward from the connecting bit 11a, at inside of the main shaft 3. Width of the connecting bit 11a, which is a kind of a thicken portion for communicating between inside and outside of the main shaft 3, is set to be slightly smaller than that of the guide slit 12. By this manner, sliding of the connector bit 11a along the guide slit 12 is facilitated to enable forward and rearward moving of the manipulator piece 10.

The connector 11 is extended rearward until meeting with the actuator piece 6; and, meanwhile, a protrusion 15 is extended from forefront end of the connector 11 as to have length and width that are tantamount to those of the guide slit 12. The protrusion 15 slide-wise moves within a guide slit 12 and the wide slit 14 in correspondence with slide-wise moving of the manipulator piece 10. In particular, when the manipulator 10 is positioned at rearmost possible position, the protrusion 15 is disposed at the guide slit 12 as to conceal a perforation of the guide slit 12; thus, preventing the perforation to be exposed to view from outside, and thereby improving ornamental effect.

The manipulator piece 10 and actuator piece 6 are integrally molded. When assembling to a writing implement, the integrally molded product is inserted from forefront opening of the main shaft 3; and then, manipulator piece 10 is pulled out through the wide slit 14 and is mounted onto the guide slit 12 and guide groove 14. After such inserting and mounting, a forefront shaft 5 is fixed on forefront end of the main shaft 3 to complete a writing implement 1. At this completed state, rear fringe of the forefront shaft 5 reaches forefront of the guide slit 12; and the forefront shaft 5 covers the wide slit 14 that is for assembling the manipulator piece 10 by pulling out the manipulator piece 10 from inside of the main shaft 3. Thus, the wide slit 14 is not exposed to outside and no damaging of appearance is made.

Figure 7:
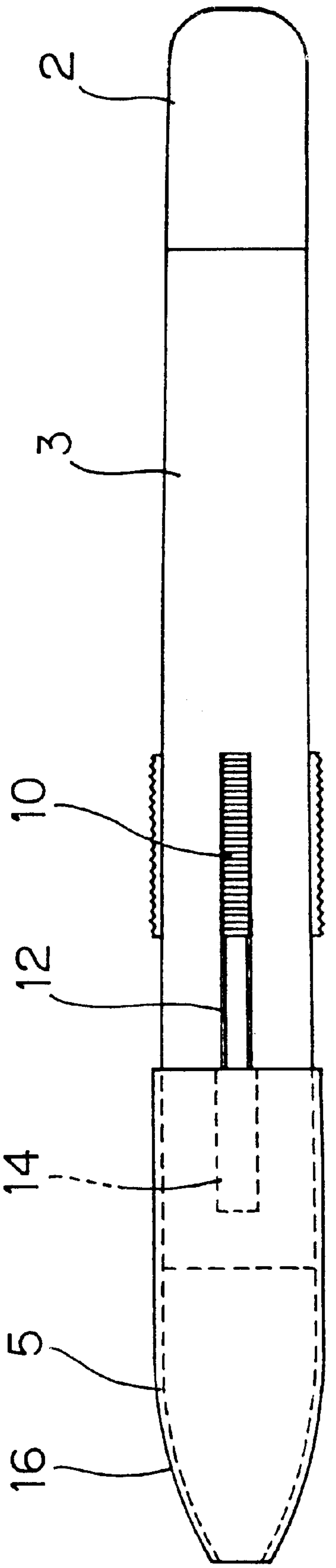
FIG. 7 shows the writing implement disposed with a gripper element.

Following construction of the forefront shaft 5 may also be adopted: only rear fringe portion of the forefront shaft 5 overlaps the main shaft 3; and a slip-preventing gripper element 16 formed of elastic material is disposed at an area including the wide slit 14, with which finger tips are to contact, as to cover the wide slit 14; as shown in FIG. 7 at use of the writing implement 1.

Whereas four writing elements 4 are explained as accommodated in the above-mentioned embodiment, there may arise a following problem. Slits 12,14 slightly weaken shaft strength of the writing implement 1, when the slits 12, 14 having several millimeter widths and having ten and several millimeter lengths are disposed at center portion of the main shaft 3 having a diameter of about 12 mm. When wall thickness of the main shaft 3 is increased in view of strength, external dimension of the main shaft 3 further increases. To cope with this problem, reinforcing ribs in axial direction, which are formed of ridges with projecting dimension of slightly less than 1 mm, may be disposed between guide slits 12 on central portion of the main shaft 3. The reinforcing ribs may be disposed to extend from forefront region having the wide slit 14 to a region having the actuator pieces 6. Number of the writing elements 4 accommodated in the writing shaft may be not limited to four but may be three or one.

The main shaft 3 including the reinforcing ribs is to be formed as slender and elongated due to usage in a writing implement. Inside of the main shaft 3, a supporter portion 3a is formed to support the actuator pieces 6 and the restoration springs 7. Thus, a resin-molding tool is constructed to open in the fore-to-rear direction of the main shaft 3. When the reinforcing ribs at forefront of the supporting portion 3a are disposed as distanced from the supporting portion 3a, undercut portions arise. In view of this, the reinforcing ribs are disposed to continue from the supporting portion 3a to the forefront region; and inner diameter of the main shaft 3 is set to slightly become larger and larger as approaching forefront in tool opening or separating-out direction. If constructed in this way, the supporting portion 3a acts as tool-opening line and the resin-molding tool do not become complicated due to a construction of fore-to-rear separation of the tool while preventing increase of parts or elements for the main shaft.

Assembling of the above-wise constructed writing implement 1 may be made as follows. Firstly, actuator-manipulator units each comprised of the manipulator piece 10, the actuator piece 6 and connector 11 are inserted from forefront opening of the main shaft 3. Then, the manipulator pieces 10 are respectively pulled out through the wide slits 14, as to secure the actuator-manipulator units by hooking the connecting bit 11*a* on the guide slit 12. Hereafter, refills 4 are inserted from the forefront opening of the main shaft 3, so as rear ends of the refills 4 pass through respective through holes penetrating the actuator pieces 6 and further pass through the restoration springs 7 or coil springs to be seized by refill seizers 8 that hold the restoration springs 7. In this way, writing elements and manipulator mechanisms are arranged on their operation positions at inside and outside of the main shaft 3. When the forefront shaft 5 is mounted to the forefront opening of the main shaft 3, assembling of the writing implement 1 is completed.

In hereto-mentioned embodiment, refills 4 pass through actuator pieces 6 and are supported by the refill seizers 8 on a rear cap 2, as to secure enough length for the refills. Nevertheless, to achieve advancing and retracting action of the writing elements or refills 4, a construction shown in FIG. 8 may also be adopted, in which rear end portions 4*b* of the refills 4 are fitted into the actuator pieces 6 by a predetermined penetrating length; rods 9 are respectively formed at rear of the actuator pieces 6; and spring seizers 9*a* are formed at rear ends of the rods 9 to hold the restoration springs 7. When this structure is compared with a conventional structure of seizing the refills 4 which has refill seizers projected forward from the actuator pieces, length for the refills are longer by an extent of penetrating the rear end portions 4*b* into the actuator pieces 6.

FIGS. 9 and 10 show another modification in respect of the essential part shown in the FIG. 3. This modification comes under the third aspect of the invention mentioned in the summary of the invention. FIG. 10 shows a transverse section corresponding FIG. 4. As shown in the FIG. 9, traverse-sectional dimensions of the actuator pieces 6 are reduced to coincide with diameters of a bunch of the refills 4. Arrangement for accommodating the refills 4 or writing elements is same with that shown in FIG. 1. Nevertheless, a manner of securing the actuator pieces that advanced forward is slightly different from the arrangement of the FIG. 1, when writing elements or refills 4 are kept in a position for writing as in the FIG. 5.

As evident from the FIGS. 9 and 10, a second projecting portion 6*c* at rear end portion of the actuator piece 6 at advanced position is not supported nor seized by a set of the first projections 6*a*' of the other actuator pieces 6'. The rear end portion having the second projection 6*c* is pressed to be outward in radial direction, as viewed in a transverse section of the main shaft 3, by a set of the first projecting portions 6*a*' of the other actuator pieces 6. Thus, the rear end portion of the actuator piece 6 comes to bear on a shoulder 3*c* formed on inner surface of the main shaft 3 at verge of large-internal-diameter part 3*b* of the main shaft 3. In this way, rearward moving of the actuator piece 6 at advanced position is prevented, as to facilitate writing.

Forefront end portion of the actuator piece 6 having the first projecting portion 6*a* is explained to be sector-shaped as expanded outward in a transverse section of the main shaft; nevertheless, the forefront end portion of the actuator piece 6 may be column-shaped in same diameter with the refills 4*b*. In other words, the action of outward pressing on an inner surface of the main shaft 3 may be made by pressing the rear end portion of the actuator 6 having the second projecting portion 6*c*, and subsequently moving radially outward. Therefore, the first projecting portion 6*a* may be shaped to merely take a role of bearing and supporting a rear end portion 4*b* of the refill 4, so as the role of the forefront end portion having the first projecting portion 6*a* in the above embodiment is taken by the rear end portion 4*b* of the refill 4.

Whereas the inner face of the main shaft 3 is illustrated as a circular cylinder in FIG. 10, traverse-sectional shape of the inner face may be polygonal, of star or the like. When shaped polygonal so as the wall thickness of the main shaft is varied, such thicken portions may be extended to forefront end of the main shaft to take a role of the above-mentioned reinforcing ribs.

In following, second embodiment of the invention will be described with reference to FIGS. 11–16.

Figure 11:
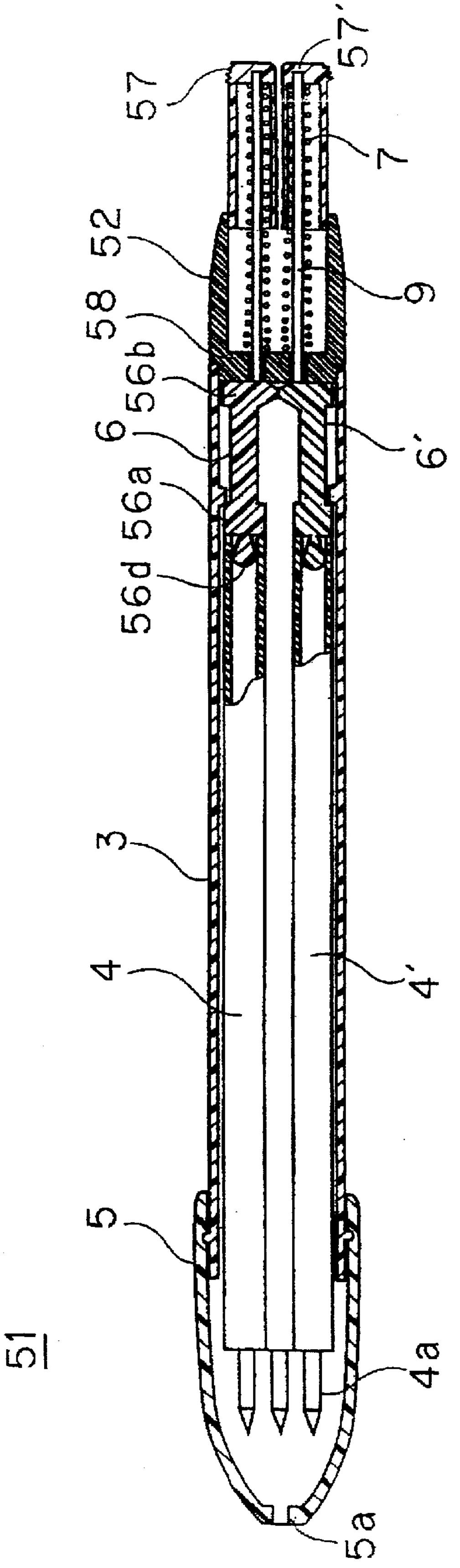
FIG. 11 is a longitudinal sectional view showing a writing implement of second embodiment.

FIG. 11 shows a longitudinal section of the writing implement, as in a same manner with the FIG. 1. Slide-wise handling of the writing elements are made by manipulator pieces equipped at rear end of the writing implement. The push-out-type writing implement 51 of this embodiment is comprised of; a rear shaft 52; main shaft 3 whose rear end is closed by the rear shaft 52; four ball-point-pen refills 4,4', which are different in color with each other, and accommodated in the main shaft 3; and a front shaft 5 that forms an opening for pushing out and retrieval of writing tip 4*a* of the refills 4.

Figure 12:
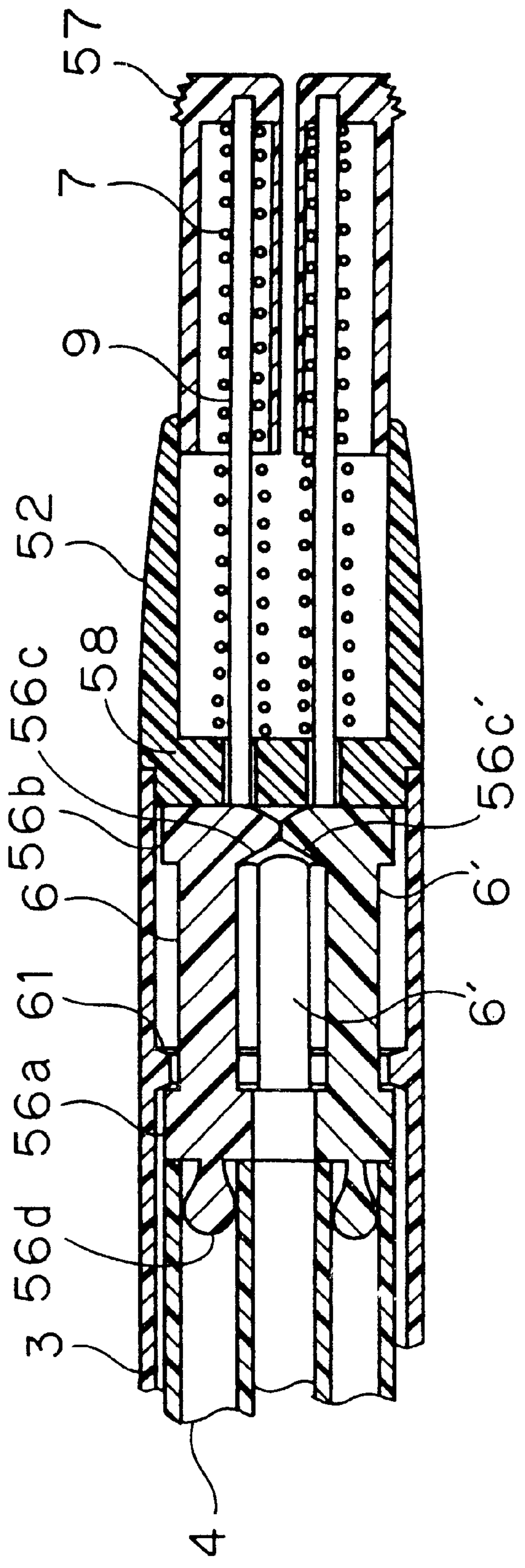
FIG. 12 is a longitudinal sectional view showing an essential portion of the writing implement of the FIG. 11.

As shown in FIG. 12 in detail, the rear shaft 52 is comprised of a supporting portion 58 for fitting with and closing up a rear end opening of the main shaft 3; and a hollow cylinder extending rearward and having a rear opening provided with manipulator pieces 57, 57', each of which is used for slide-wise moving respective one of the refills 4 to a position available for writing. Rear portion of the each refill 4 is secured as fitted onto a respective refill bearer 56*d* that is integrally formed with an actuator piece 6 at forefront end thereof. In rear of the each actuator piece 6, a rod 9 is integrally formed with the actuator piece 6, for slide-wise moving the actuator piece 6. The each rod 9 penetrates through the supporting portion 58 and protrudes out from rear end of the main shaft 3. A restoration spring 7 is attached on the each rod 9.

The restoration spring 7, which is a compression spring, constantly applies a stress on the rod 9 in a direction of pulling it rearward; and thus, in normal state, the actuator pieces 6 engaged with the refills 4 are latched as butted on a wall face of the supporting portion 58. At rear end of the each rod 9, cap-shaped manipulator pieces 57 are respectively disposed to cover the rod 9 and the restoration spring 7 at an area protruding from the main shaft 3, in a decorative way.

Figure 13:
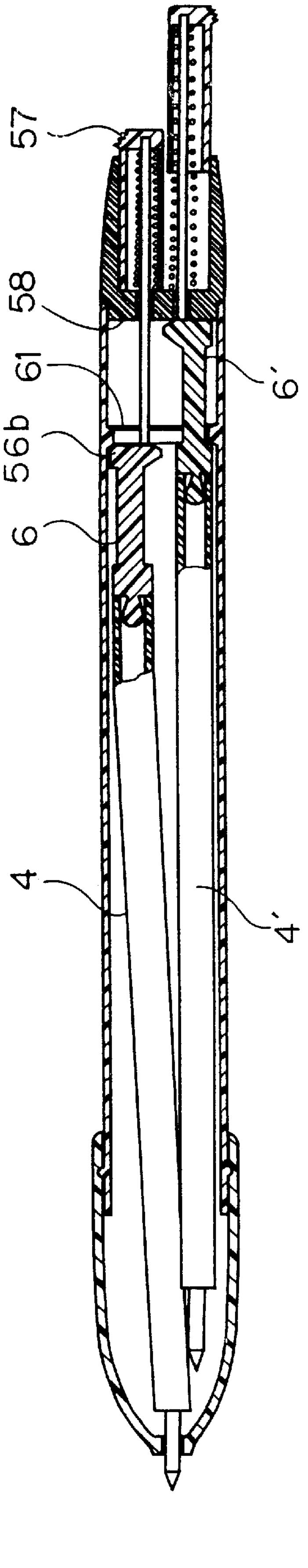
FIG. 13 is a transverse sectional view showing a writing state of the writing implement of the FIG. 11.
Figure 14:
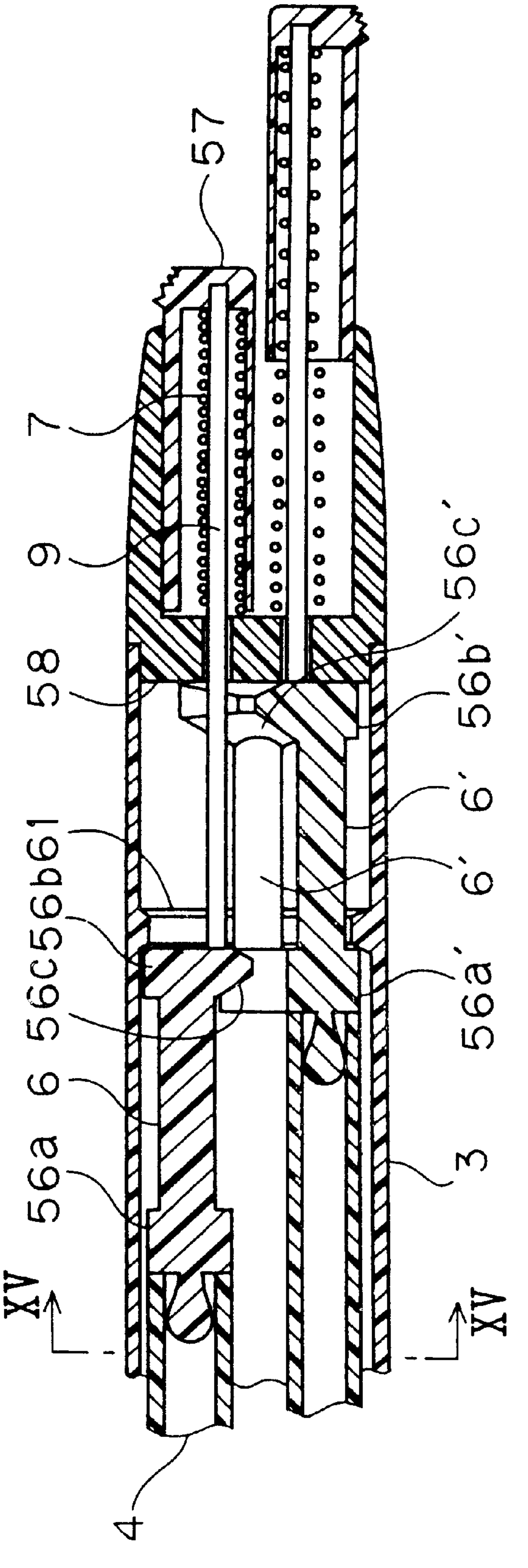
FIG. 14 is an enlarges partial view of the FIG. 13, showing an essential portion.
Figure 16:
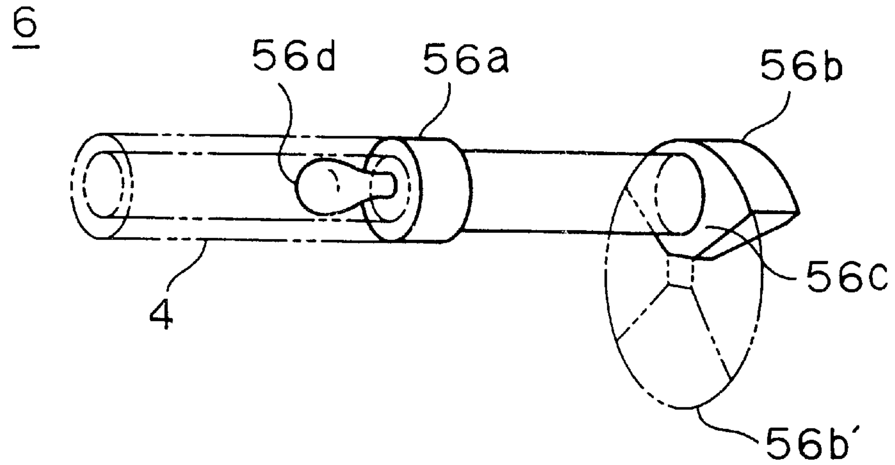
FIG. 16 is a perspective view showing an actuator piece. of the second embodiment, appeared especially in FIG. 14.

FIGS. 13 and 14 show the writing implement 1 in a position or state readily available for writing. To reach such a writing position, the actuator pieces 6, which is illustrated in a perspective view of FIG. 16, is slide-wise moved forward by pushing to slide a manipulator piece 57 on rear end of the rear shaft 52, using one of the fingers (including a thumb); in a manner as to move the rod 9 forward against a stress of the restoration spring 7. In this way, a refill 4 to be used is pushed out and is retracted after use; or a refill 4 of one color is changed with a refill 4 of another color for switching colors. As shown in FIG. 16, the actuator piece 6 is shaped as an axially elongated rod and has a first projecting portion 56*a* at forefront end thereof, which has same diameter with the rear end portion of the refill 4.

Figure 15:
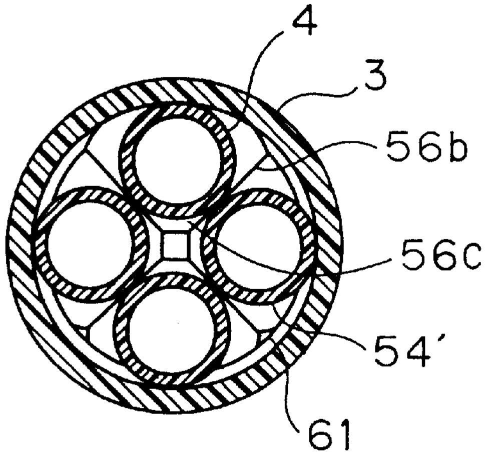
FIG. 15 is a transverse sectional view of the writing implement shown in the FIG. 11.

As shown in FIG. 15, when four refills 4 each connected with first projecting portion 56*a* are laterally gathered together, a bunch of the four refills 4 together with the first projecting portion 56*a* has an overall periphery that is almost coincided with, and at same time slightly distanced, from the inner face of the main shaft 3. In this way, diameter of the main shaft 3 is ultimately minimized in a multiplex writing implement. It is needless to say that a forefront part of the writing implement has a minimum clearance required for to-center-axis swerving of the refill 4 while advancing toward writing position.

As shown in FIG. 16, each of the actuator pieces 6 has a second projecting portion 56*b* shaped as a substantially right-angled sector expanding in radially outward, which has a circumferential face extending along an inner face of the main shaft 3 and has a sloped cam face 56*c*. The second projecting portion 56*b* is distanced rearward from the first projecting portion 56*a* by a stroke for switching the refills 4. In original normal state as shown in FIGS. 15 and 16, a bunch of four of the second projecting portions 56*b,* which is gathered together in side by side manner at rear of the bunch of the four refills 4, has an overall outer periphery shaped as a circle formed of four sector bunched together. The bunch of the second projecting portions 56*b* is kept as butted on the supporting portion 58 by action of the restoration spring 7 for pulling the rod 9 and function of the sloped cam face 56*c*.

The main shaft 3 has a small-internal-diameter portion 61 formed of a ring-band shaped projection that is slightly projected from and stepped with other part of inner face of the main shaft 3, at rear of the first projecting portion 56*a* of the actuator piece 6 that butts on the supporting portion 58. As shown in FIG. 15, the internal diameter of the main shaft 3 is set as to facilitate slide-wise moving of the four refills 4; and meanwhile, diameter of the small-internal-diameter portion 61 is set as smaller as not to allow disposing of the bunch of the first projecting portions 56*a* that are gathered side by side. When to shift to a writing position, one of the actuator pieces 6 for respective one of the refills 4 is moved forward; and then, a second projecting portion 56*c* of the one actuator piece 6 is moved to pass over the small-diameter-portion 61, as to approach with first projecting pieces 56*a*' of the other three actuator pieces 6'. In this occasion, radially outward propelling force is created by function of the sloped cam face 56*c,* so as the very second projecting portion 56*c* to be disposed side by side with the first projecting portions 56*a*' of the other actuator pieces 6'. Then, by a stopper-bar function of a stepped portion at verge of the small-diameter-portion 61, such writing position is kept after release of the pressing force on the manipulator piece 57.

When one of the actuator piece 6 is moved forward by pressing a respective manipulator piece 57 as to shift one of the refills 4 to a writing position, one of first projecting portions 56*a* comes forefront of the other first projecting portions 56*a,* as to form a lateral clearance within the main shaft 3. Then, a second projecting portion 56*b* at rear of the one first projecting portion 56*a* advances into the lateral clearance. This second projecting portion 56*a* passed through the small-diameter-portion 61 and engages with a set of the first projecting portions 56*a*' of the other three actuators 6'. In this occasion, the other first projecting portions 56*a*' are pushed outwardly by function of the sloped cam face 56*c.* Consequently, when having got over the small-diameter-portion 61, the second projecting portion 56*b* comes to be disposed side-by-side with the first projecting portions 56*a'.*

After such pushing out action, if manipulating force is lifted, rearward-pulling stress of the restoration spring 7 is applied on actuator piece 6. However, rearward moving of the actuator piece 6 is prevented by a stepped portion on verge of the small-diameter-portion 61. Thus, refill 4 connected to the advanced actuator piece 6 is kept at a position available for writing, as shown in FIGS. 13 and 14. In such writing position, when one of the another actuator pieces 6' is moved forward, corresponding one of the first projecting pieces 56*a* comes off forward which has supported the second projecting portion 56*b* of the advanced actuator 6 for the writing-position. Thus, the second projecting portion 56*b* moves inward; or toward a central axis, and then, gets over the stepped portion on a verge of the small-diameter-portion 61, to thereby return rearward and butts on the supporting portion 58. If the one of another actuator pieces 6' thus advanced is further moved forward, a second projecting portion 56*b* of this actuator piece 6' gets over the small-diameter-portion 61 and comes to be disposed side by side with a set of three of the first projecting portions 56*a'.* When hand-applied force or manipulating force is lifted, a refill 4 engaged with the newly advanced actuator piece 6' is kept at a writing position, by herefore-mentioned mechanism.

Figure 17:
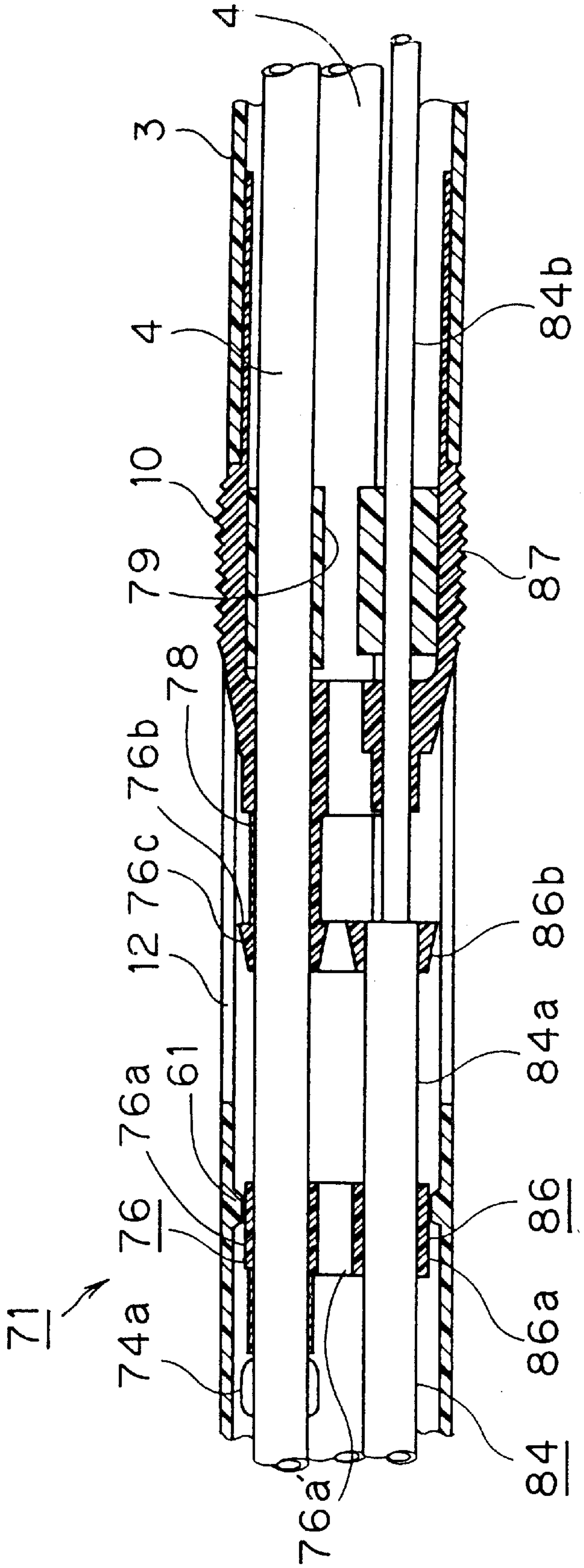
FIG. 17 is a longitudinal sectional view showing essential part of a writing implement in third embodiment.

In following, third embodiment of the invention is described with reference to FIGS. 17–19, and part of the FIG. 20. In this embodiment, a writing implement 71 is a multiplex writing implement in which mechanical pencil(s) and ballpoint pen(s) are disposed as readily slidable. The writing implement may be a complex of one mechanical pencil and one ballpoint pen, a complex of mechanical pencils with different diameters of lead and one or more ballpoint pen(s), or a complex of ballpoint pen in different colors and one or more mechanical pencil(s).

Figure 18:
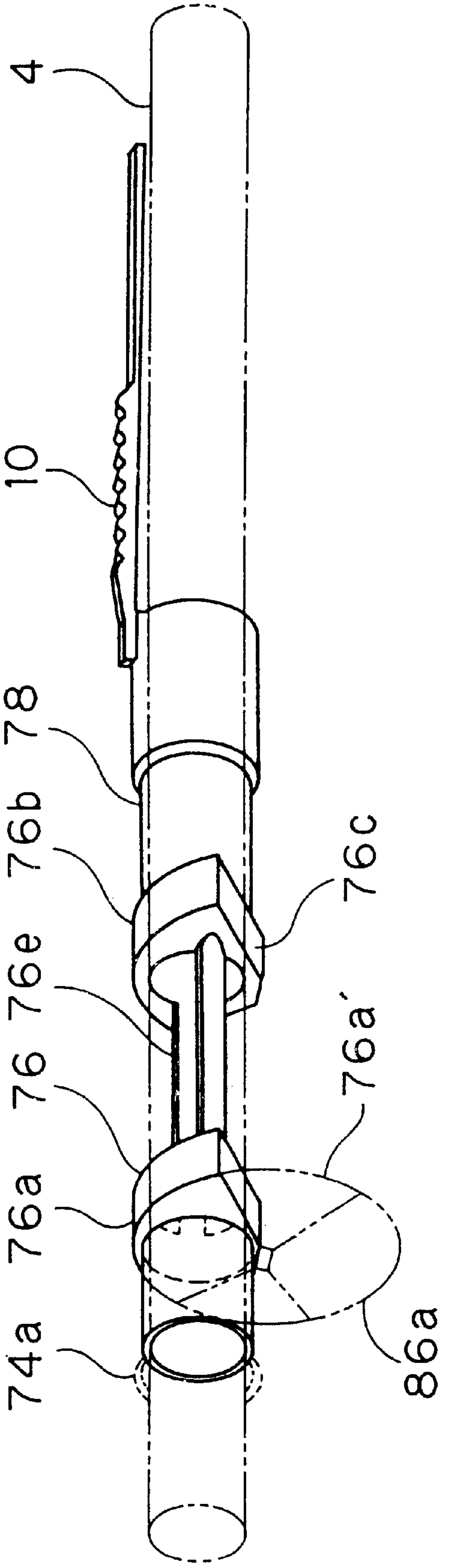
FIG. 18 is a perspective view showing actuator and manipulator pieces of the writing implement of the FIG. 17.
Figure 19:
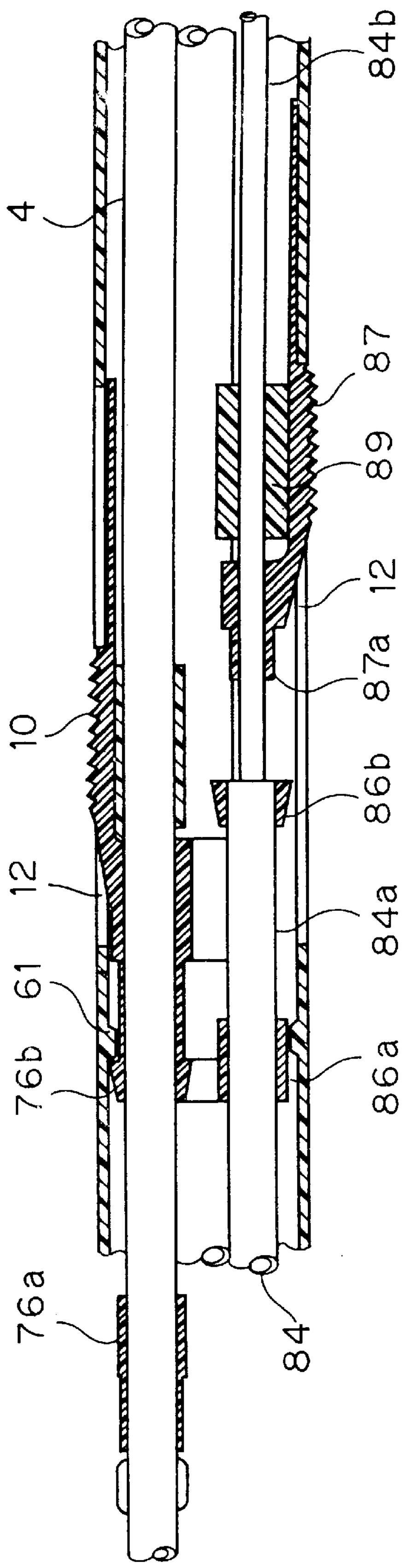
FIG. 19 shows a writing state of the writing implement of the FIG. 17.

At outside of a near-center portion of the main shaft 3, manipulator pieces 10 are disposed, as shown in FIG. 18 that illustrates a construction having actuator and manipulator pieces as in FIG. 6. By handling of a manipulator piece 10, an actuator piece 76 disposed inside of the main shaft 3 is moved forward and rearward to push out and retract a tip of ballpoint-pen refill 4 from a tip of a forefront shaft; thus, a writing position of the refill 4 being kept or lifted. The manipulator piece 10 is positioned at rear of the actuator piece 76 that is hooked as readily slidable on a guide slit 12 perforated on the main shaft 3. The manipulator piece 10 is integrally connected with a connector 78 disposed in the main shaft 3 from outside to inside.

The actuator pieces 76 and connectors 78 have cylindrical hollows or are hollow cylindrical; and each refill 4 is inserted into such cylindrical hollows as to be held in them. Outside shaping of the actuator pieces 76 are rather similar with the actuator piece 6 of the second embodiment; each actuator piece 76 has a first projecting portion 76*a* at forefront, and has, at rear, a second projecting portion 76*b* having a sloped cam face 76*c* and having an external diameter slightly larger than that of the first projecting portion 76*a.* Whereas the first and second projecting portions 76*a,* 76*b* have cylindrical hollows, a pair of them are integrally connected with each other by connecting strip(s) 76*e.* At forefront of the first projecting portion 76*a,* an outward-bulging stopper 74*a* is disposed on a refill 4 to prevent rearward shifting of the refill 4 relative to the actuator piece 76. Therefore, external diameter of the first projecting portion 76*a* becomes larger than that in the second embodiment, by a dimension of thickness of the first projecting portion 76*a.*

The manipulator pieces 10 butts on rear edge of the guide slit 12 and stopped. In such returned or retracted position, the first projecting portion 76*a* of the actuator piece 76 is disposed at a small-internal-diameter portion 61 in a ring-band shape, which is slightly step-wise protruding from an inner face of the main shaft 3. Rearward stopping of the refill 4 at returned position may be made by stopping on rear part of the main shaft, as shown in FIG. 20, instead of the above where stopping is made by abutting rear end of the manipulator piece 10 onto rear edge of the guide slit 12.

As in same manner with the second embodiment, the main shaft 3 has an internal diameter allowing four refills 4 to slide-wise moving; and the small-internal-diameter portion 61 has an internal diameter allowing four of the first projecting portions 76*a,* each inserted with a refill 4, to be side-by-side wise disposed. When one of the actuator piece 76 for a refill 4 is moved forward, a second projecting portion 76*b* of the one actuator piece 76 comes close to the small-internal-diameter portion 61. In this occasion, as shown in FIG. 19, the second projecting portion 76*b* engages with first projecting portions 76*a* of the other actuator pieces 76 that are inserted with refills 4' or a fastener-bearer portion 84*a* of a mechanical pencil 84. After further moving forward, the second projecting portion 76*b* gets over the small-internal-diameter portion 61; and then first projecting portion 76' inserted with other refill 4' returns rearward by action of the restoration spring 7 at rear.

After such pushing out of the refill 4, when hand-applied force is lifted, the actuator piece 76 in advanced position undergoes rearward force. Nevertheless, the second projecting piece 76*b* in advanced position is prevented from rearward moving, by a set of first projections 76*a*' of the other actuators 76', and by a stopper action of a stepped portion on verge of the small-internal-diameter portion 61. Thus, after lifting of hand-applied force on the manipulator piece 10, the writing position is continuously kept.

In such a writing position, it goes same manner as described earlier; with respect to restoration action of the actuator and manipulator pieces 76, 10 by advancing the another actuator 76'; and then, with respect to keeping the advanced refill 4' at writing position after further advancing the another actuator 76.

Assembling of the writing implement 71 may be made as follows. Firstly, an integrally molded unit is prepared, which is comprised of a manipulator piece 10, an actuator piece 76 and connector 78; a stopper 74*a* and a spacer 79 are fitted on a refill 4; and, into a cylindrical hollow portion of the integrally molded unit, the refill 4 is inserted until a stopper 74*a* abuts on forefront end of the actuator piece 76, as to complete a writing unit. Thus completed writing units are inserted into a main shaft 3 from a forefront opening thereof; and the manipulator pieces 10 are pulled out to outer face of the main shaft 3 through respective guide slits 12, as to be held in the main shaft. Naturally, the spacers 79 are moved to their illustrated position after the manipulator pieces 10 arrive on guide slits 12.

As shown in FIG. 20, rear end portion of each refill 4 is inserted as to pass through a respective through hole on a supporting portion 88 disposed on rear part of the main shaft 3, and then, inserted into a restoration spring 7 mounted on a refill bearer 8 as to abut on the refill bearer 8. In this way, all of writing elements and manipulation mechanism are accommodated in the main shaft or held on manipulation positions on outside of the main shaft. By mounting a forefront shaft on a forefront opening of the main shaft 3, assembling of the writing implement 71 is completed.

In following, a construction of a mechanical pencil 8 is described. In FIG. 17, numeral 84*a* designates a fastener-bearer formed of metal pipe or plastic pipe. Though not shown, forefront tip of the fastener-bearer 84*a* is connected with a writing element proper. Numeral 84*b* designates lead casing, which has a chuck on forefront end though not shown and is inserted into the fastener-bearer 84*a*. By clicking of the lead casing. 84*b*, a lead is gradually pushed out forward.

Rear end of the fastener-bearer 84*a* fits into a cylindrical hollow of the first and second projecting portions 86*a,* 86*b* of the integrally formed actuator 86 as to be secured with each other. As rearward distanced from the actuator piece 86 by a predetermined distance, the lead casing 84*b* is fitted into and secured with a cylindrical holder 87*a* on a manipulator piece 87 that is disposed on a guide slit 12 and at outside of the main shaft 3. Construction for holding the mechanical pencil is same with that for the ballpoint pen described earlier; in respect of shapes and dimensions of the first and second projecting portions 86*a,* 86*b* of the actuator piece 86; in respect of positional relationship between the small-internal-diameter portion 61 and the projecting portions; and in respect of dimensions of, and positional relationship between the actuator and manipulator pieces 87.

In above manner, the lead casing 84*b* of the mechanical pencil is fitted into the holder 87*a* on a manipulator piece 10 as to be held. Thus, hand-applied force is transmitted from the lead casing 84*b* to the actuator 86 attached on a rear end portion of the fastener-bearer 84*a*; so as to facilitate pushing out of the mechanical pencil by handling the manipulator piece 10, and as to facilitate gradual pushing out or clicking out of pencil lead by pushing and forward shifting of the lead casing 84*b*.

In conventional multiplex writing implement containing a mechanical pencil usually has a problem in that force of gripping a lead is weak so as the pencil lead sinks into a writing implement under a pressure while writing, because supporting and holding is made to the lead casing itself. According to the above invention-wise construction, to contrary, force of gripping the pencil lead is made as high as that of a mechanical pencil of single use or non-multiplex type, as to eliminate the problem of the conventional multiplex writing implement. Moreover, the manipulator 87 takes a role of advancing the actuator piece 86 that is separate with the manipulator 87 and, in same time, a role of gradual forward feeding of the pencil lead by advancing the lead casing 84*b*.

In the above embodiment, the actuator piece 86 is formed separate with the mechanical pencil and secured on a fastener-bearer 84*a*. Nevertheless, protrusions congruent with the first and second projecting portions 86*a,* 86*b* may be integrally formed on the fastener-bearer 84*a*, as to be hooked on the small-internal-diameter portion 61. In this occasion, across section at the protrusion in lieu of the second projecting portion is circular; thus, corresponding portion on the small-internal-diameter portion is formed to be congruent with the circular cross section as to reliably achieve supporting and hooking. By such construction, after a user has pulled out a mechanical pencil element for charging of pencil leads, reinserting of the mechanical pencil element is easily made with no care of a direction of the actuator piece.

Another embodiment will be described with reference to FIG. 20, which is an enlarged view showing rear end portion of a multiplex writing implement having a mechanical pencil and ballpoint-pen refills. For this embodiment, parts not shown in the FIG. 20 may be constructed in same manner with either of the first, second and third embodiments and their modifications mentioned earlier.

A refill 4 disposed in the main shaft 3 penetrates through a supporting portion 88 and extends to a rear cap 92 closing a rear opening of the main shaft 3. A refill bearer is 8 mounted on rear end of a restoration spring 7 deposed around the refill 4; and the refill bearer 8 abuts on the rear cap 92 under stress applied by the restoration spring 7. In this way, the refill 4 is held in a position.

Meanwhile, rear end of the lead casing **84*b* is fitted into and held in an open cylindrical hollow of receptacle 93, which is disposed at rear of the rear cap 92. A recess 94 formed on rear of the receptacle 93 holds an eraser 96, external faces of which are enclosed by a cover 95. The receptacle 93 is forward and rearward slidable within a predetermined length in a cylindrical hollow of the rear cap 92, under a stress of the restoration spring 7 that is disposed between the supporting portion 88*a* of the main shaft 3 and the receptacle 93. By such sliding motion, the lead casing 84*b*** is stepwise advanced by clicking as to feed out the pencil lead from a tip of the mechanical pencil.

In an example of the above embodiment, feeding out of the pencil is made by the sliding motion of the receptacle 93; and the advancing and retracting of the actuator piece together with the writing element is made at a manipulator piece 87 at forefront part of the main shaft 3 as in the third embodiment. Nevertheless, both of the feeding out of the pencil lead and of the advancing of the actuator may be made by the sliding motion of the receptacle 93.

In the example of the above embodiment, the actuator piece 86 is disposed at rear end of the fastener-bearer **84*a* of the mechanical pencil; and the manipulator piece 87 is attached on the lead casing 84*b*. Nevertheless, the manipulator piece may be attached on the fastener-bearer 84*a*. Meanwhile, in respect of advancing of the ballpoint-pen refill 4, the manipulator piece may be disposed at near of the rear end of the main shaft as in FIGS. 3–4, instead of disposing at near of the actuator piece 76**.

CROSS-REFERENCE TO RELATED APPLICATIONS

This application is based upon and claims the benefits of priority from the prior Japanese Patent Applications No. 2001-153148 filed on May 22, 2001, and No. 2002-39275 filed on Feb. 15, 2002; the contents of which are incorporated herein by reference.

What is claimed is:

1. A writing implement comprising:

a plurality of manipulator pieces disposed on outside;

a plurality of actuator pieces moved by respective one of the manipulator pieces, in at least foreword and rearward directions;

writing elements arranged in a hollow main shaft as to be slidable along an inner face of the main shaft;

springs each applying rearward stress on respective one of the actuator pieces;

each of said actuator pieces comprising:

a first projecting piece projecting in a traverse-sectional wise direction of the main shaft, at forefront part of the actuator piece; and a second projecting piece likewise projecting in a traverse-sectional wise direction of the main shaft, as disposed as distanced from the first projecting piece by a predetermined length;

said main shaft having a small-internal-diameter part in vicinity of rearmost retracted position of the first projecting portion, and having a large-internal-diameter part larger in a diameter of the small-internal-diameter part at least in a region forefront of the small-internal-diameter part;

said second projecting piece having a cam face as shaped for creating a stress in the traverse-sectional wise direction when another second projecting portion of other one of the actuator pieces axially bears down thereto; and each of said actuator pieces being connectable with respective one of the writing elements.

2. A writing implement according to claim 1, further comprising another cam face on the first projecting portion, for creating a stress in a traverse-sectional wise direction when said another second projecting portion of other one of the actuator pieces axially bears down thereto.

3. A writing implement according to claim 2, wherein a laterally-gathered bunch of said forefront part of the actuator pieces has a diameter substantially same with that of a laterally-gathered bunch of rear end faces of the writing elements connected with the actuator pieces; and wherein at least one of said writing element is a mechanical pencil, and said actuator piece is attached on rear end portion of a fastener-bearer of the mechanical pencil.

4. A writing implement according to claim 1 or claim 2, wherein a laterally-gathered bunch of said forefront part of the actuator pieces has a diameter substantially same with that of a laterally-gathered bunch of rear end faces of the writing elements connected with the actuator pieces.

5. A writing implement according to claim 1, wherein each of said manipulator pieces is exposed at a part to be gripped at writing or in vicinity of such to-be-gripped part and is connected with respective one of the actuator pieces as transmitted with handling force applied on the actuator piece.

6. A writing implement according to claim 1, wherein each of said manipulator pieces is formed as connected with respective one of the actuator pieces and is exposed to outside from a through hole provided on the main shaft.

7. A writing implement according to anyone of claims 1–2, and 5–6, wherein at least one of said writing element is a mechanical pencil, and said actuator piece is attached on rear end portion of a fastener-bearer of the mechanical pencil.

* * * * *